(12) United States Patent
Kang et al.

(10) Patent No.: US 9,990,098 B2
(45) Date of Patent: Jun. 5, 2018

(54) TOUCH SCREEN PANEL (71) Applicant: Samsung Display Co., Ltd., Yongin-si, Gyeonggi-do (KR)

(72) Inventors: Sung-Ku Kang, Yongin-si (KR); Choon-Hyop Lee, Yongin-si (KR); Jeong-Heon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 15/360,866

(22) Filed: Nov. 23, 2016

(65) Prior Publication Data

US 2017/0075458 A1    Mar. 16, 2017

Related U.S. Application Data (63) Continuation of application No. 13/902,747, filed on May 24, 2013, now abandoned.

(30) Foreign Application Priority Data

Feb. 5, 2013   (KR) .......................... 10-2013-0012888

(51) Int. Cl.
G06F 3/044    (2006.01)

(52) U.S. Cl.
CPC .... G06F 3/044 (2013.01); *G06F 2203/04103* (2013.01); *G06F 2203/04111* (2013.01); *G06F 2203/04112* (2013.01)

(58) Field of Classification Search
CPC ........... G06F 3/044; G06F 2203/04112; G06F 2203/04103; G06F 2203/04111
See application file for complete search history.

(56) References Cited

U.S. PATENT DOCUMENTS

| 7,742,041 | B2 | 6/2010 | Lee et al. |
| 7,920,129 | B2 | 4/2011 | Hotelling et al. |
| | | (Continued) | |

FOREIGN PATENT DOCUMENTS

| KR | 10-2012-0038130 A | 4/2012 |
| KR | 10-2012-0062178 A | 6/2012 |
| KR | 10-2012-0065686 | 6/2012 |

OTHER PUBLICATIONS

U.S. Office action dated Aug. 7, 2014, for cross reference U.S. Appl. No. 13/791,556, (10 pages).

*Primary Examiner* — Liliana Cerullo
(74) *Attorney, Agent, or Firm* — Lewis Roca Rothgerber Christie LLP (57) ABSTRACT

A touch screen panel includes a substrate having a first surface and a second surface opposite the first surface, a plurality of first sensing electrodes coupled in a first direction, and a plurality of second sensing electrodes coupled in a second direction crossing the first direction, the first and second sensing electrodes being on the first surface, a plurality of third sensing electrodes overlapping the first sensing electrodes, a plurality of fourth sensing electrodes overlapping the second sensing electrodes, the third and fourth sensing electrodes being on the second surface, wherein the sensing electrodes on the first surface and the sensing electrodes on the second surface overlapping each other are electrically coupled to each other through coupling units for coupling the first surface of the substrate and the second surface of the substrate to each other.

9 Claims, 6 Drawing Sheets

(56) References Cited

U.S. PATENT DOCUMENTS

| | | |
|---|---|---|
| 8,217,902 B2 | 7/2012 | Chang et al. |
| 8,546,705 B2 | 10/2013 | Chang et al. |
| 9,019,232 B2 | 4/2015 | Kang et al. |
| 2007/0242054 A1 | 10/2007 | Chang et al. |
| 2009/0085885 A1* | 4/2009 | Wu .................. G06F 3/041 345/173 |
| 2009/0273572 A1 | 11/2009 | Edwards et al. |
| 2010/0123680 A1 | 5/2010 | Lee et al. |
| 2010/0231549 A1 | 9/2010 | Chien et al. |
| 2010/0253646 A1 | 10/2010 | Hiratsuka |
| 2011/0128240 A1 | 6/2011 | Choi |
| 2011/0134073 A1 | 6/2011 | Ahn |
| 2011/0193793 A1 | 8/2011 | An et al. |
| 2011/0234530 A1 | 9/2011 | Kim et al. |
| 2011/0279410 A1 | 11/2011 | Han et al. |
| 2011/0304578 A1 | 12/2011 | Kim et al. |
| 2012/0019473 A1 | 1/2012 | Edwards |
| 2012/0056664 A1 | 3/2012 | Nam |
| 2012/0098791 A1 | 4/2012 | Hamada et al. |
| 2012/0147467 A1 | 6/2012 | Park |
| 2012/0162099 A1 | 6/2012 | Yoo et al. |
| 2012/0218221 A1 | 8/2012 | Igeta |
| 2012/0235931 A1 | 9/2012 | Lee et al. |
| 2012/0299638 A1* | 11/2012 | Han .................. G06F 3/044 327/517 |
| 2013/0009908 A1 | 1/2013 | Kuo |
| 2013/0106752 A1 | 5/2013 | Lin et al. |
| 2013/0155011 A1 | 6/2013 | Kim et al. |
| 2013/0207911 A1 | 8/2013 | Barton et al. |
| 2013/0257785 A1 | 10/2013 | Brown et al. |
| 2013/0257786 A1 | 10/2013 | Brown et al. |
| 2014/0002378 A1 | 1/2014 | Kim et al. |
| 2014/0035833 A1 | 2/2014 | Gorsica et al. |
| 2014/0041216 A1 | 2/2014 | Cok |
| 2014/0043280 A1 | 2/2014 | Cok |
| 2014/0055403 A1 | 2/2014 | Cok |

* cited by examiner

TOUCH SCREEN PANEL

CROSS-REFERENCE TO RELATED APPLICATION

This application is a continuation of U.S. patent application Ser. No. 13/902,747, filed May 24, 2013, which claims priority to and the benefit of Korean Patent Application No. 10-2013-0012888, filed Feb. 5, 2013, the entire content of both of which is incorporated herein by reference.

BACKGROUND

1. Field

The present invention relates to a touch screen panel.

2. Description of the Related Art

A touch screen panel is an input device capable of selecting the indication content displayed on the screen of an image display device by a human hand or an object to input the command of a user.

Therefore, the touch screen panel is provided on the front face of the image display device to convert a contact position of the human hand or the object into an electrical signal. Therefore, the indication content selected at the contact position is received as an input signal.

Because the touch screen panel may replace an additional input device coupled to the image display device to operate the image display device, such as a keyboard and a mouse, widespread use of touch screen panels have been gradually increasing.

Methods of operating a touch screen panel include a resistance layer method, a photo-sensing method, and an electro-capacitive method.

Among the above methods, the widely used electro-capacitive touch screen panel senses a change in capacitance formed by a conductive sensing electrode with another peripheral sensing electrode or a ground electrode when the human hand or the object contacts the touch screen panel to convert the contact position into the electrical signal.

The electro-capacitive touch screen panel is commonly attached to the external surface of the image display device such as a liquid crystal display (LCD) and an organic light emitting display (OLED). Therefore, the touch screen panel may have high transparency and small thickness characteristics.

In addition, recently, a flexible image display device has been developed so that the touch screen panel attached onto the flexible image display device also has a flexible characteristic.

In general, in the touch screen panel, the sensing electrodes may be formed of a transparent conductive material such as indium tin oxide (ITO). In this case, when the flexible touch screen panel is bent or folded, cracks may be generated in the sensing electrodes so that driving defects may result.

A touch screen panel that has a flexible characteristic, that is not easily damaged in various bending or deforming environments, and that may secure a strong conductive layer characteristic is desired.

SUMMARY

Accordingly, embodiments of the present invention have been made to provide a touch screen panel capable of securing a flexible characteristic and a strong conductive layer characteristic.

An embodiment of the present invention provides a touch screen panel including a substrate having a first surface and a second surface opposite the first surface, a plurality of first sensing electrodes on the first surface of the substrate and coupled in a first direction, a plurality of second sensing electrodes arranged between the first sensing electrodes and coupled in a second direction crossing the first direction, a plurality of first coupling patterns coupling the first sensing electrodes in the first direction, a plurality of second coupling patterns alternating with the first coupling patterns and coupling the second sensing electrodes in the second direction, a plurality of third sensing electrodes on the second surface of the substrate and overlapping the first sensing electrodes, a plurality of fourth sensing electrodes arranged between the third sensing electrodes and overlapping the second sensing electrodes, a plurality of third coupling patterns coupling the third sensing electrodes in the first direction, and a plurality of fourth coupling patterns coupling the fourth sensing electrodes in the second direction, wherein the sensing electrodes on the first surface and the sensing electrodes on the second surface overlapping each other are electrically coupled to each other through coupling units for coupling the first surface of the substrate and the second surface of the substrate to each other.

The first coupling patterns on the first surface of the substrate and the fourth coupling patterns on the second surface of the substrate may alternate with each other, and wherein the second coupling patterns on the first surface of the substrate and the third coupling patterns on the second surface of the substrate alternate with each other.

The coupling patterns arranged to cross each other may be limited to a central area of the substrate.

The sensing electrodes may include parts that extend to inside of the coupling units to contact the sensing electrodes on the opposite surface of the substrate.

The sensing electrodes may include regions opened by the coupling units.

The sensing electrodes and the coupling patterns may include a transparent electrode material.

The touch screen panel may further include outside wiring lines for coupling the first sensing electrodes and the second sensing electrodes to an external driving circuit through units of lines in the first direction and the second direction, respectfully.

The first and second sensing electrodes may be at a same layer.

The substrate may be a thin film substrate including at least one selected from the group consisting of polyethylene terephthalate (PET), polycarbonate (PC), acryl, polymethylmethacrylate (PMMA), triacetyl cellulose (TAC), polyethersulfone (PES), and polyimide (PI).

As described above, according to embodiments of the present invention, the sensing electrodes may be formed on both surfaces of the substrate to overlap each other and the sensing electrodes on both surfaces of the substrate may be electrically connected to each other through the vertical connecting parts so that driving defects at the touch screen panel may be reduced (or minimized). Although partial cracking or shorting may occur, the flexible characteristic and the strong conductive layer characteristic may be secured.

In addition, in the connecting patterns for connecting the adjacent sensing electrodes, the connecting patterns for connecting the sensing electrodes in different directions may be arranged to alternate with each other so that the flexible characteristic may be increased (or improved).

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" or "coupled to" another element, it can be directly connected or coupled to the other element or be indirectly connected or coupled to the other element with one or more intervening elements interposed therebetween. Hereinafter, like reference numerals refer to like elements.

Hereinafter, the embodiments of the present invention will be described in detail with reference to the accompanying drawings.

Figure 1:
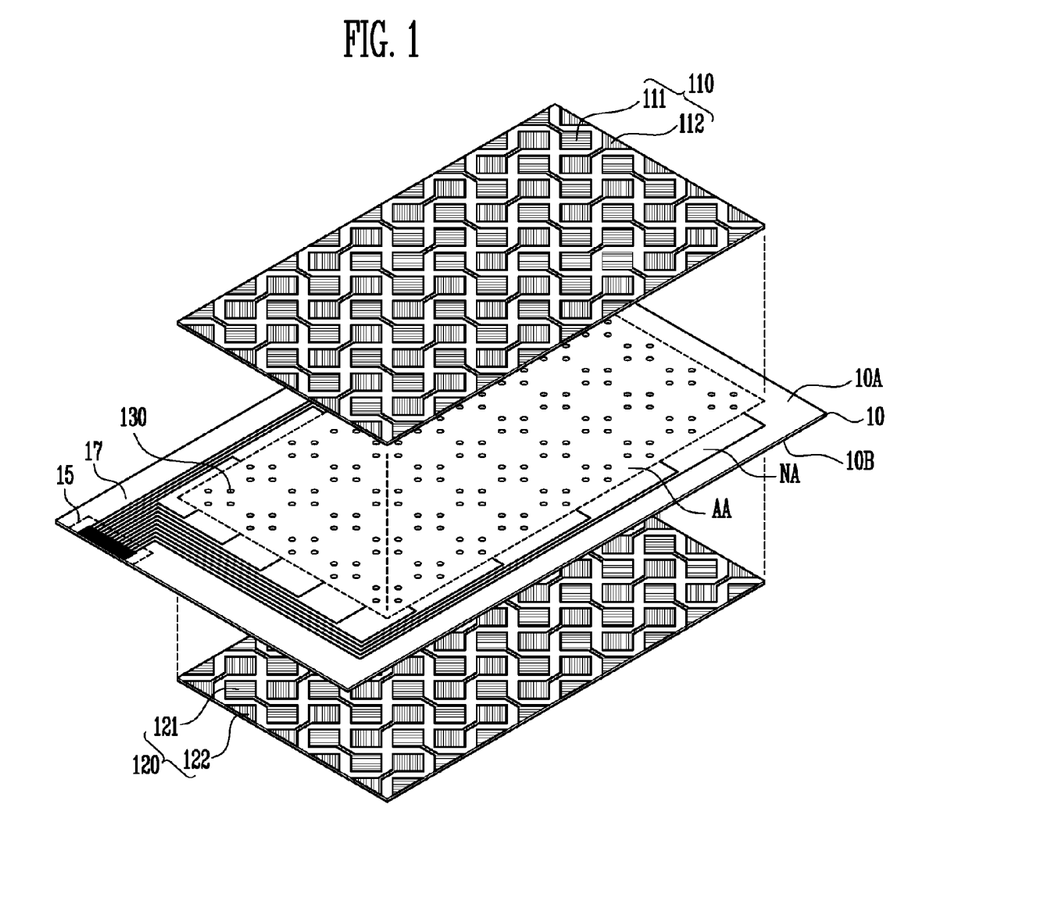
FIG. 1 is a perspective view schematically illustrating an example of a touch screen panel.

FIG. 1 is a perspective view schematically illustrating an example of a touch screen panel.

Referring to FIG. 1, a touch screen panel according to an embodiment of the present invention includes a substrate 10 having a first surface 10A and a second surface 10B opposite to the first surface 10A, sensing electrodes 110 of the first surface 10A of the substrate 10, sensing electrodes 120 of the second surface 10B of the substrate 10, and outside wiring lines 17 formed on the outside of the substrate 10 to couple (or connect) the sensing electrodes 110 and 120 to an external driving circuit (not shown) through a pad unit 15.

The substrate 10 may be divided into a touch active area AA that overlaps an image display area and in which the sensing electrodes 110 and 120 are formed and a touch non-active area NA that is positioned (or located) on the outside of the touch active area AA and in which the outside wiring lines 17 are formed.

The substrate 10 is formed of a transparent material having a flexible characteristic and high thermal and chemical resistance and may be a thin film substrate formed of at least one selected from the group consisting of, for example, polyethylene terephthalate (PET), polycarbonate (PC), acryl, polymethylmethacrylate (PMMA), triacetyl cellulose (TAC), polyethersulfone (PES), and polyimide (PI).

The sensing electrodes 110 of the first surface 10A of the substrate 10 include a plurality of first sensing electrodes 111 arranged to be distributed in the touch active area AA on the substrate 10 and formed to be electrically coupled to each other in a first direction D1 and a plurality of second sensing electrodes 112 arranged to be distributed between the first sensing electrodes 111 so as not to overlap the first sensing electrodes 111 and formed to be electrically coupled to each other in a second direction D2 that intersects the first direction D1.

That is, the first sensing electrodes 111 and the second sensing electrodes 112 are alternately arranged to be coupled in different directions. For example, the first sensing electrodes 111 may be formed to be coupled in a row direction (a horizontal direction) and may be respectively coupled to the outside wiring lines 17 in units of row lines and the second sensing electrodes 112 may be formed to be coupled in a column direction (a vertical direction) and may be respectively coupled to the outside wiring lines 17 in units of column lines.

The first sensing electrodes 111 and the second sensing electrodes 112 may be formed of a transparent electrode material such as indium tin oxide (ITO) to transmit light.

In the case where the sensing electrodes are formed on a thin film substrate having a flexible characteristic, when the flexible substrate is bent or folded, partial cracking or shorting may occur in the sensing electrodes which may cause driving defects.

According to embodiments of the present invention, in order to reduce (or minimize) the driving defects of the touch screen panel caused by damage of the sensing electrodes, the sensing electrodes are formed on both surfaces of the substrate to overlap each other, and the sensing electrodes on the both surfaces of the substrate are electrically coupled to each other through vertical connecting units.

For example, a plurality of third sensing electrodes 121 are formed on the second surface 10B of the substrate 10 so as to overlap corresponding first sensing electrodes 111 and a plurality of fourth sensing electrodes 122 are formed between the third sensing electrodes 121 so as to overlap corresponding second sensing electrodes 112.

In addition, vertical connecting units (or vertical coupling units or coupling units) 130 for coupling the first surface 10A and the second surface 10B to each other are formed on the substrate 10, and the sensing electrodes 110 of the first surface 10A and the corresponding sensing electrodes 120 of the second surface 10B formed to overlap each other are electrically coupled to each other through the vertical connecting units 130.

For example, the first sensing electrodes 111 are electrically coupled to the third sensing electrodes 121 and the second sensing electrodes 112 are electrically coupled to the fourth sensing electrodes 122.

The connecting patterns of the sensing electrodes and the vertical connecting units will be described in detail with reference to FIGS. 2A and 2B.

The outside wiring lines 17 for coupling the first sensing electrodes 111 and the second sensing electrodes 112 to the external driving circuit through units of lines in the first direction D1 and the second direction D2 are electrically coupled to, for example, the first and second sensing electrodes 111 and 112 in units of row and column lines, which couple the first and second sensing electrodes 111 and 112 to the external driving circuit, such as a position detecting circuit, through the pad unit 15.

The outside wiring lines 17 arranged in the touch non-active area NA outside the touch screen panel to avoid the touch active area AA, in which an image is displayed, may be formed of a low resistance metal material such as molybdenum (Mo), silver (Ag), titanium (Ti), copper (Cu), aluminum (Al), and/or Mo/Al/Mo other than a transparent electrode material used for forming the sensing electrodes.

Although not shown, the outside wiring lines for coupling the third sensing electrodes 121 and the fourth sensing electrodes 122 to the external driving circuit may be formed on the second surface 10B of the substrate, similar to the outside wiring lines 17 formed on the first surface 10A of the substrate.

When an object such as a human hand or a stylus pen contacts the above-described electro-capacitive touch screen panel, a change in capacitance in accordance with a contact position is transmitted from the sensing electrodes 110 and 120 to the driving circuit via the outside wiring lines 17 and the pad unit 15. Then, the change in the capacitance may be converted into an electrical signal by an X and Y input processing circuit (not shown) so that the contact position is received.

Because the sensing electrodes 110 and 120 arranged on the both surfaces of the substrate 10 are electrically coupled to each other in the touch screen panel according to embodiments of the present invention, a touch event generated on one surface corresponds to the same touch event being generated on the opposite surface. However, embodiments of the present invention are not limited to the above as the sensing electrodes of both surfaces may be formed to be independently driven in a partial area.

Figure 2A:
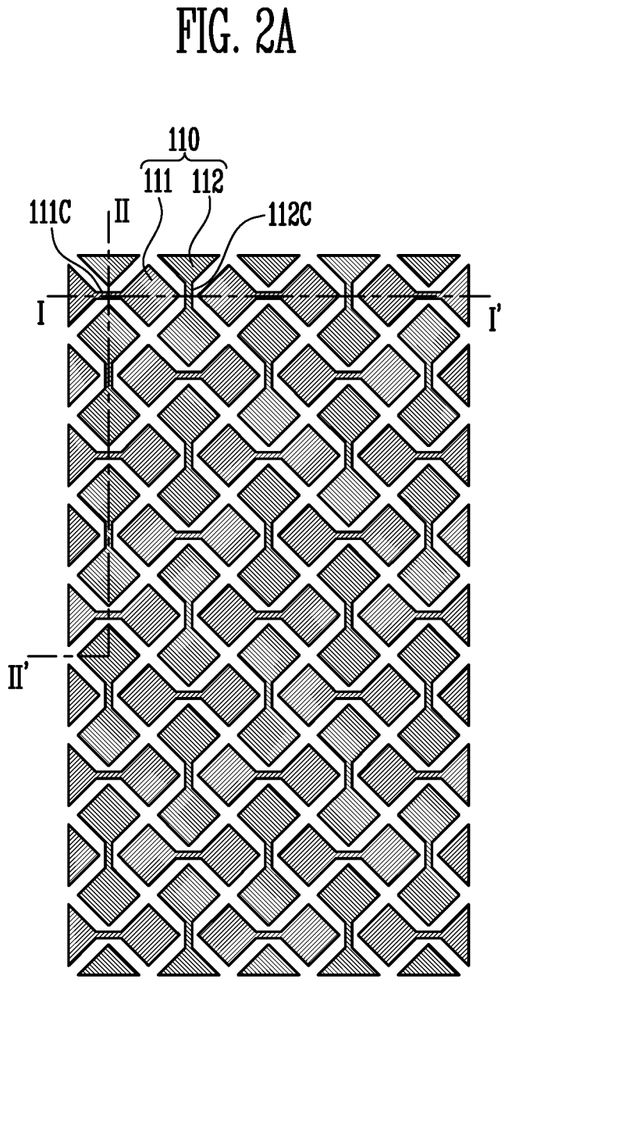
FIG. 2A is a plan view illustrating sensing electrodes on the first surface of the touch screen panel of FIG. 1.

FIG. 2A is a plan view illustrating sensing electrodes on the first surface of the touch screen panel of FIG. 1. FIG. 2B is a plan view illustrating sensing electrodes on the second surface of the touch screen panel of FIG. 1. FIG. 3A is a cross-sectional view of the touch screen panel taken along the line I-I' of FIGS. 2A and 2B. FIG. 3B is a cross-sectional view of the touch screen panel taken along the line II-II' of FIGS. 2A and 2B.

Figure 2B:
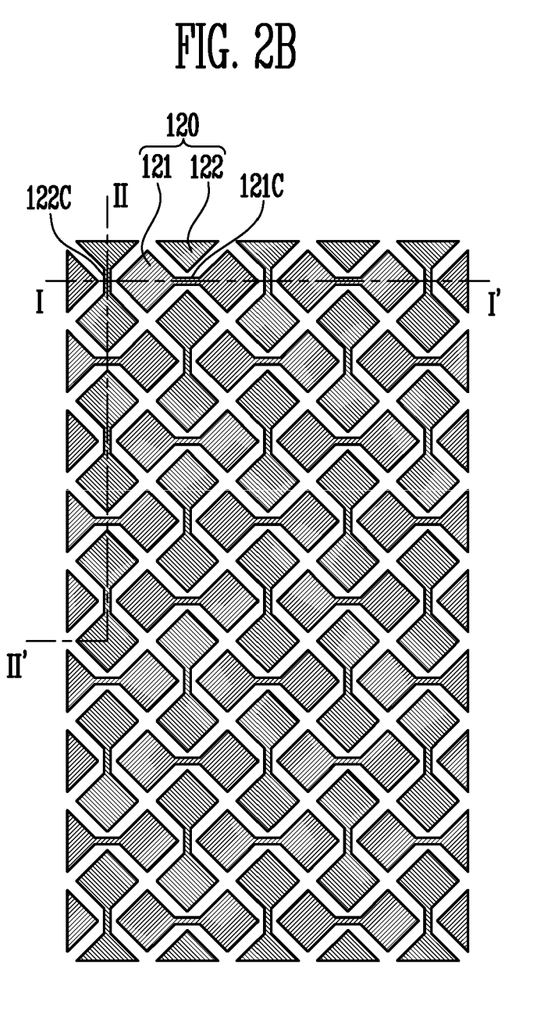
FIG. 2B is a plan view illustrating sensing electrodes on the second surface of the touch screen panel of FIG. 1.
Figure 3A:
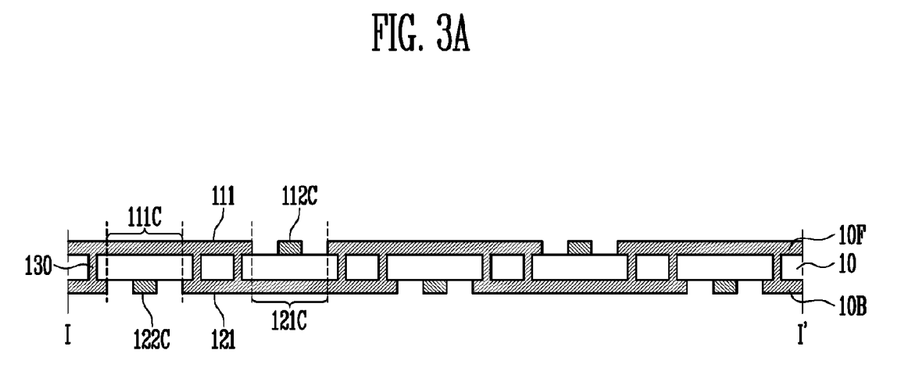
FIG. 3A is a cross-sectional view of the touch screen panel taken along the line I-I' of FIGS. 2A and 2B.
Figure 3B:
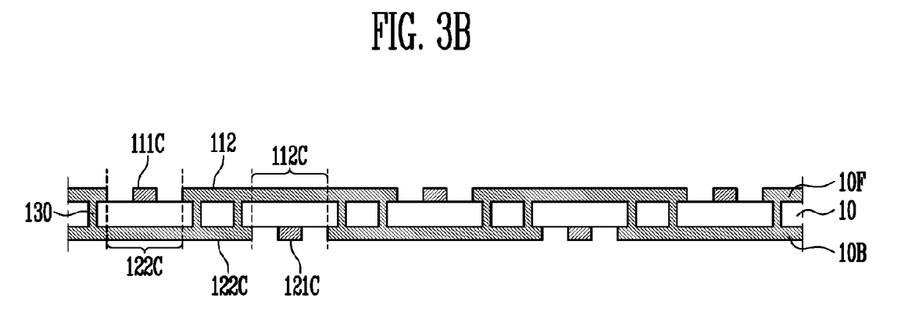
FIG. 3B is a cross-sectional view of the touch screen panel taken along the line II-II' of FIGS. 2A and 2B.

For convenience sake, in FIGS. 2A and 2B, only the sensing electrodes 110 and 120 illustrated in FIG. 1, respectively, are shown.

Referring to FIGS. 2A to 3B, the sensing electrodes 110 formed on the first surface 10A of the touch screen panel according to embodiments of the present invention include the plurality of first sensing electrodes 111 formed to be coupled in the first direction D1 and the plurality of second sensing electrodes 112 arranged between the first sensing electrodes 111 and formed to be coupled in the second direction D2 that intersects the first direction D1.

Here, the first and second sensing electrodes 111 and 112 may be formed of the same material, may be diamond-shaped, and may be arranged in the same layer. The material, shape, and arrangement structure of the first and second sensing electrodes 111 and 112 may have various modifications.

In addition, the touch screen panel includes a plurality of first connecting patterns (or first coupling patterns) 111C for coupling the first sensing electrodes 111 in the first direction D1 and a plurality of second connecting patterns (or second coupling patterns) 112C arranged to alternate with the first connecting patterns 111C and coupling the second sensing electrodes 112 to each other in the second direction D2.

That is, the first sensing electrodes 111 are coupled by the first connecting patterns 111C in the first direction D1. The second sensing electrodes 112 are coupled by the second connecting patterns 112C in the second direction D2. The first connecting patterns 111C and the second connecting patterns 112C are arranged to alternate with each other.

For example, in the uniserial first sensing electrodes 111 arranged in the first direction D1, the first sensing electrodes 111, each two of which make a pair, are coupled by the first connecting patterns 111C and the pairs of the first sensing electrodes 111 coupled by the connecting patterns are not coupled to adjacent pairs but are separated from the adjacent pairs.

In addition, in the uniserial first sensing electrodes 112 arranged in the second direction D2, the second sensing electrodes 112, each two of which make a pair, are coupled by the second connecting patterns 112C and the pairs of the first sensing electrodes 112 coupled by the connecting patterns are not coupled to adjacent pairs but are separated from the adjacent pairs.

Between the separated first sensing electrodes 111, the second connecting patterns 112C for coupling the adjacent second sensing electrodes 112 are repeatedly arranged on both sides of the pairs of the first sensing electrodes 111. Between the separated second sensing electrodes 112, the first connecting patterns 111 C for coupling the adjacent first sensing electrodes 111 are repeatedly arranged on both sides of the pairs of the second sensing electrodes 112.

Additionally, the touch screen panel includes a plurality of third sensing electrodes 121 formed on the second surface 10B of the substrate 10 to overlap corresponding first sensing electrodes 111 and a plurality of fourth sensing electrodes 122 arranged between the third sensing electrodes 121 and formed to overlap corresponding second sensing electrodes 112.

Here, the third and fourth sensing electrodes 121 and 122 may be formed of the same material, may be diamond-shaped, and may be arranged at the same layer. The material, shape, and arrangement structure of the third and fourth sensing electrodes 121 and 122 may have various modifications.

The sensing electrodes 110 of the first surface 10A of the substrate 10 and the sensing electrodes 120 of the second surface 10B of the substrate 10 may be formed to have the same shape so that sensing areas of the corresponding sensing electrodes overlap each other.

In different embodiments, the sensing electrodes 110 of the first surface 10A of the substrate 10 and the sensing electrodes 120 of the second surface 10B of the substrate 10 may be formed so that corresponding partial sensing areas of the sensing electrodes overlap each other.

In addition, the touch screen panel includes a plurality of third connecting patterns (or third coupling patterns) 121C for coupling the third sensing electrodes 121 in the first direction D1 and a plurality of fourth connecting patterns 122C for coupling the fourth sensing electrodes 122 in the second direction D2 on the second surface 10B, similar to the arrangement of the above-described first surface 10A.

That is, the third sensing electrodes 121 are coupled by the third connecting patterns 121C in the first direction D1, the fourth sensing electrodes 122 are coupled by the fourth connecting patterns (or fourth coupling patterns) 122C in the second direction D2, and the third connecting patterns 121 C and the fourth connecting patterns 122C are arranged to alternate with each other.

For example, in the uniserial third sensing electrodes 121 arranged in the first direction D1, the third sensing electrodes 121, each two of which make a pair, are coupled by the third connecting patterns 121C and the pairs of the third sensing electrodes 121 are not coupled to adjacent pairs but are separated from the adjacent pairs.

In addition, in the uniserial fourth sensing electrodes 122 arranged in the second direction D2, the fourth sensing electrodes 122, each two of which make a pair, are coupled by the fourth connecting patterns 122C and the pairs of the fourth sensing electrodes 122 are not coupled to adjacent pairs but are separated from the adjacent pairs.

Between the separated third sensing electrodes 121, the fourth connecting patterns 122C for coupling the adjacent fourth sensing electrodes 122 are repeatedly arranged on both sides of the pairs of the third sensing electrodes 121. Between the separated fourth sensing electrodes 122, the third connecting patterns 121C for coupling the adjacent third sensing electrodes 121 are repeatedly arranged on both sides of the pairs of the fourth sensing electrodes 122.

As a result, on a plane, the connecting patterns of the first surface 10A and the connecting patterns of the second surface 10B are arranged so that the first connecting patterns 111 C and the fourth connecting patterns 122C on an opposite surface alternate with each other, and the second connecting patterns 112C and the third connecting patterns 121C on an opposite surface alternate with each other.

The sensing electrodes and the connecting patterns may be formed of a transparent electrode material including indium tin oxide (ITO). When the connecting patterns are formed of the transparent electrode material, the sensing electrodes and the connecting patterns may be integrally patterned from a step of patterning the transparent electrode material so that processes may be simplified.

The sensing electrodes 110 of the first surface 10A and the sensing electrodes 120 of the second surface 10B are electrically coupled by the vertical connecting units 130 for coupling the first surface 10A and the second surface 10B.

For example, the first sensing electrodes 111 are coupled to corresponding third sensing electrodes 121 on an opposite surface and the second sensing electrodes 112 are coupled to corresponding fourth sensing electrodes 122 on an opposite surface.

In some embodiments, the vertical connecting units 130 may include a plurality of contact holes that pass through the substrate 10. In a process of forming the sensing electrodes 110 and 120 on the substrate 10 where the plurality of contact holes are formed, parts of the sensing electrodes may be extended to the insides of the contact holes so that the sensing electrodes formed on both surfaces of the substrate 10 contact each other.

In particular, in the case of the thin film substrate, because the thickness of the substrate 10 is very small, the material of which the sensing electrodes 110 and 120 are formed may be easily filled in the contact holes of the substrate 10.

In the present embodiment, the two vertical connecting units 130 are formed in one sensing area. However, the number, size, and shape of the vertical connecting units 130 may vary.

In the other embodiments, the sensing electrodes may be in the form of meshes having areas that are opened by the vertical connecting units.

As described above, the uniserial sensing electrodes have parts coupled by the connecting patterns and parts that are not coupled by the connecting patterns. The uniserial sensing electrodes have partially separated patterns but are electrically coupled to each other by the vertical connecting units 130 for coupling both surfaces of the substrate.

For example, in a line of the first direction D1, in parts where coupling of the first sensing electrodes 111 is cut off, the third sensing electrodes 121 on an opposite surface are coupled by the third connecting patterns 121C and, in parts where coupling of the third sensing electrodes 121 is cut off, the first sensing electrodes 111 on an opposite surface are coupled by the first connecting patterns 111C.

In a line of the second direction D2, in parts where coupling of the second sensing electrodes 112 is cut off, the fourth sensing electrodes 122 on an opposite surface are coupled by the fourth connecting patterns 122C, and in parts where coupling of the fourth sensing electrodes 122 is cut off, the second sensing electrodes 112 on an opposite surface are coupled by the second connecting patterns 112C.

As described above, according to embodiments of the present invention, the sensing electrodes 110 and 120 are formed on both surfaces of the substrate 10 to overlap each other and the sensing electrodes on both surfaces are electrically coupled by the vertical connecting units 130 so that, although partial cracking or shorting may occur, driving defects of the touch screen panel may be reduced (or minimized) and both a flexible characteristic and a strong conductive layer characteristic may be secured.

In particular, in the connecting patterns for coupling the adjacent sensing electrodes, the connecting patterns for coupling the sensing electrodes in different directions are arranged to alternate with each other so that a flexible characteristic may be increased (or improved).

Figure 4A:
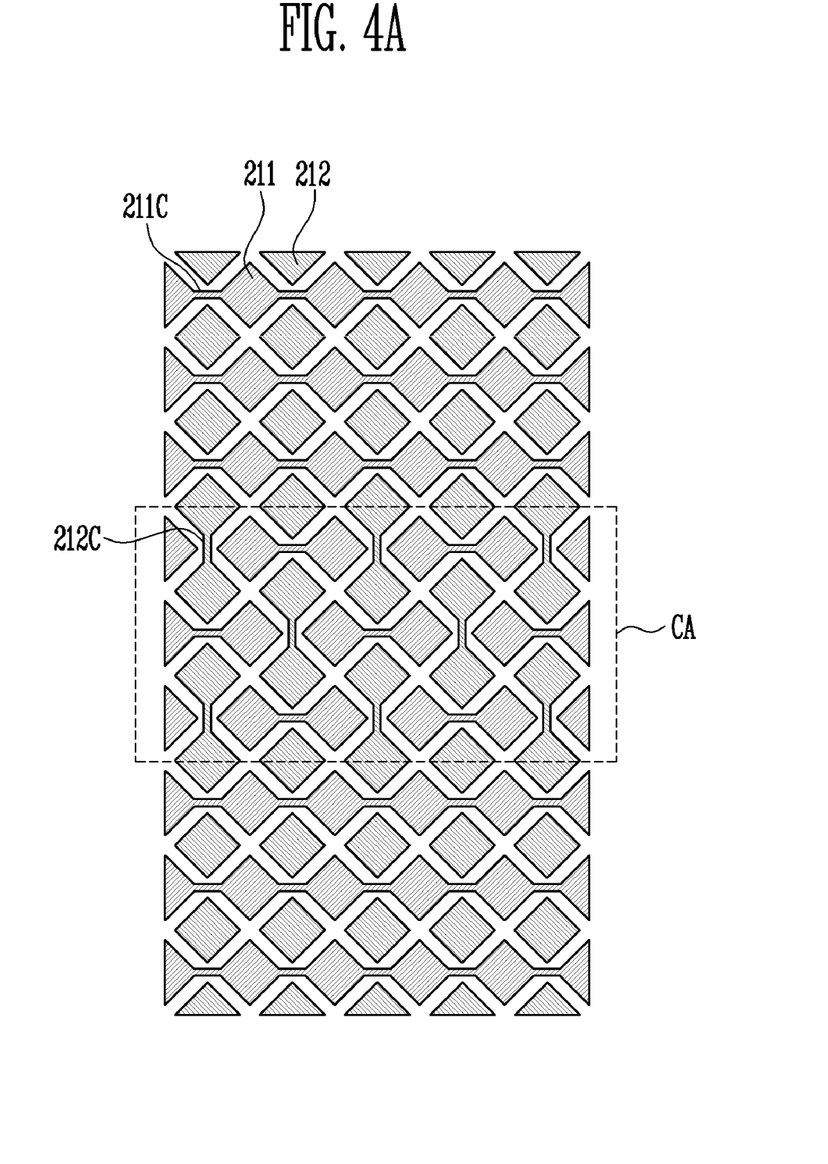
FIG. 4A is a plan view illustrating sensing electrodes on a first surface of a touch screen panel according to another embodiment of the present invention.
Figure 4B:
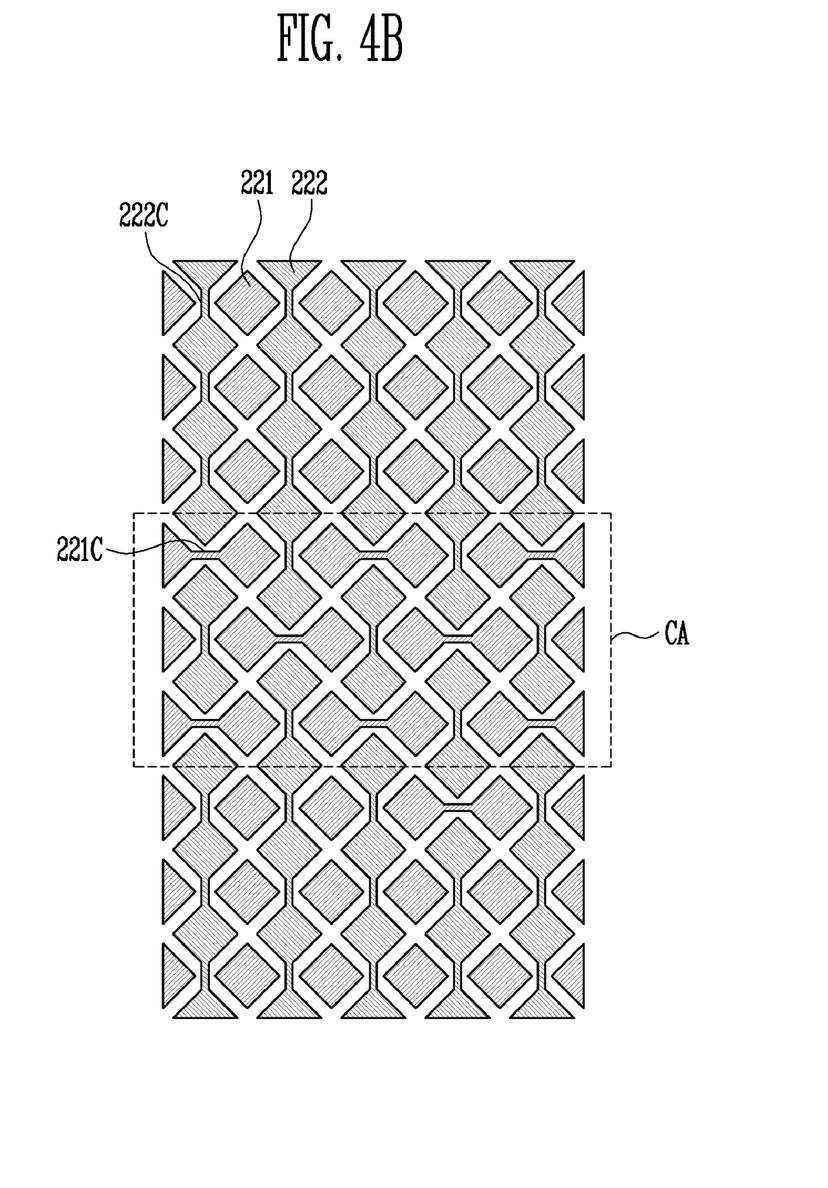
FIG. 4B is a plan view illustrating sensing electrodes on a second surface of a touch screen panel according to another embodiment of the present invention.

FIG. 4A is a plan view illustrating sensing electrodes on a first surface of a touch screen panel according to another embodiment of the present invention. FIG. 4B is a plan view illustrating sensing electrodes on a second surface of a touch screen panel according to another embodiment of the present invention.

The above-described disclosure may be referred to with respect to the elements denoted by the same reference numerals as those of the above-described elements and redundant description of the elements may be omitted.

Referring to FIGS. 4A and 4B, in the touch screen panel according to the present embodiment, the connecting patterns arranged to alternate with each other are limited to a central area CA of the substrate.

For example, in a central area CA of the first surface, as described in the above-described embodiment, between separated first sensing electrodes 211, second connecting patterns 212C for coupling adjacent second sensing electrodes 212 are repeatedly arranged on both sides of pairs of the first sensing electrodes 211. Between the separated second sensing electrodes 212, first connecting patterns 211C for coupling the adjacent first sensing electrodes 211 are repeatedly arranged on both sides of pairs of the second sensing electrodes 212.

In some embodiments, in upper and lower areas excluding the central area CA of the first surface, the first sensing electrodes 211 are coupled by the first connecting patterns 211C in the first direction D1 and the second sensing electrodes 212 are not coupled to each other but have separated island-shaped patterns.

Additionally, in a central area CA of the second surface, as described in the above-described embodiment, between separated third sensing electrodes 221, fourth connecting patterns 222C for coupling adjacent fourth sensing electrodes 222 are repeatedly arranged on both sides of pairs of the third sensing electrodes 221. Between the separated fourth sensing electrodes 222, third connecting patterns 221C for coupling the adjacent third sensing electrodes 221 are repeatedly arranged on both sides of pairs of the fourth sensing electrodes 222.

In some embodiments, in upper and lower areas excluding the central area CA of the second surface, the third sensing electrodes 221 are not coupled to each other but have separated island-shaped patterns and the fourth sensing electrodes 222 are coupled by the fourth connecting patterns 222C in the second direction D2.

As a result, all of the sensing electrodes are electrically coupled to each other. However, in the central area CA, the two kinds of connecting patterns are alternately arranged and, in the upper and lower areas excluding the central area CA, only one kind of connecting pattern may be arranged.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
    a substrate having a first surface and a second surface opposite the first surface;
    a plurality of first sensing electrodes on the first surface of the substrate and coupled in a first direction;
    a plurality of second sensing electrodes arranged between the first sensing electrodes and coupled in a second direction crossing the first direction;
    a plurality of first coupling patterns coupling the first sensing electrodes in the first direction and having a smaller width than the first sensing electrodes;
    a plurality of second coupling patterns alternating with the first coupling patterns, coupling the second sensing electrodes in the second direction, and having a smaller width than the second sensing electrodes;
    a plurality of third sensing electrodes on the second surface of the substrate and overlapping the first sensing electrodes;
    a plurality of fourth sensing electrodes arranged between the third sensing electrodes and overlapping the second sensing electrodes;
    a plurality of third coupling patterns coupling the third sensing electrodes in the first direction and having a smaller width than the third sensing electrodes; and
    a plurality of fourth coupling patterns alternating with the third coupling patterns, coupling the fourth sensing electrodes in the second direction and having a smaller width than the fourth sensing electrodes,
    wherein the sensing electrodes on the first surface and the sensing electrodes on the second surface overlapping each other are electrically coupled to each other through coupling units for coupling the first surface of the substrate and the second surface of the substrate to each other.

2. The touch screen panel as claimed in claim 1,
    wherein the first coupling patterns in the first surface of the substrate and the fourth coupling patterns on the second surface of the substrate alternate with each other, and
    wherein the second coupling patterns on the first surface of the substrate and the third coupling patterns on the second surface of the substrate alternate with each other.

3. The touch screen panel as claimed in claim 2, wherein the coupling patterns arranged to cross each other are limited to a central area of the substrate.

4. The touch screen panel as claimed in claim 1, wherein the sensing electrodes comprise parts that extend to inside of the coupling units to contact the sensing electrodes on the opposite surface of the substrate.

5. The touch screen panel as claimed in claim 4, wherein the sensing electrodes comprise regions opened by the coupling units.

6. The touch screen panel as claimed in claim 1, wherein the sensing electrodes and the coupling patterns comprise a transparent electrode material.

7. The touch screen panel as claimed in claim 1, further comprising outside wiring lines for coupling the first sensing electrodes and the second sensing electrodes to an external driving circuit through units of lines in the first direction and the second direction, respectively.

8. The touch screen panel as claimed in claim 1, wherein the first and second sensing electrodes are at a same layer.

9. The touch screen panel as claimed in claim 1, wherein the substrate is a thin film substrate comprising at least one selected from the group consisting of polyethylene terephthalate (PET), polycarbonate (PC), acryl, polymethylmethacrylate (PMMA), triacetyl cellulose (TAC), polyethersulfone (PES), and polyimide (PI).

* * * * *